United States Patent [19]

Sellers

[11] Patent Number: 4,666,171
[45] Date of Patent: May 19, 1987

[54] RECREATIONAL SLED

[76] Inventor: David Sellers, P.O. Box 158, Warren, Vt. 05674

[21] Appl. No.: 496,597

[22] Filed: May 20, 1983

[51] Int. Cl.⁴ ............................................. B62B 13/06
[52] U.S. Cl. ..................................... 280/18; 280/21 R
[58] Field of Search ............... 280/18, 28, 21 R, 12 B, 280/12 R, 609, 21 A, 12 C; D21/224

[56] References Cited

U.S. PATENT DOCUMENTS

| | | | |
|---|---|---|---|
| D. 95,466 | 4/1935 | Stone . | |
| D. 170,886 | 11/1953 | Paden et al. | D14/24 |
| D. 170,887 | 11/1953 | Paden et al. | D14/24 |
| D. 189,048 | 10/1960 | Wetzel | D34/15 |
| D. 190,959 | 7/1961 | Holcomb | D34/15 |
| D. 191,833 | 11/1961 | Brasch et al. | D34/15 |
| D. 193,077 | 6/1962 | Gorman et al. | D71/1 |
| D. 201,815 | 8/1965 | Greenberg | D34/15 |
| D. 215,506 | 9/1969 | Jones | D12/6 |
| D. 223,268 | 4/1972 | Molzen | D21/2 |
| D. 223,942 | 6/1972 | Cone et al. | D12/14 |
| D. 231,516 | 4/1974 | Johnson | D12/14 |
| D. 238,564 | 1/1976 | Skillius | D12/14 |
| D. 250,403 | 11/1978 | Ross | D12/14 |
| D. 255,820 | 7/1980 | Borden et al. | D21/2 |
| D. 257,536 | 11/1980 | Lukes | D21/2 |
| 2,480,406 | 8/1949 | Forney | 155/167 |
| 2,735,690 | 2/1956 | Paden et al. | 280/12 |
| 2,829,902 | 4/1958 | Stocker | 280/18 |
| 3,099,025 | 7/1963 | Merkley | 280/609 |
| 3,199,887 | 8/1965 | McKelvey | 280/18 |
| 3,522,952 | 8/1970 | Uttenthaler | 280/12 |
| 3,534,972 | 10/1970 | Salerno | 280/609 |
| 3,635,490 | 1/1972 | Demaree et al. | 280/18 |
| 3,782,744 | 1/1974 | Milovich et al. | 280/18 |
| 3,863,978 | 2/1975 | Gillings, Jr. | 296/63 |
| 4,028,761 | 6/1977 | Taylor | 280/18 X |
| 4,054,257 | 10/1977 | Miller, Jr. | 249/97 |
| 4,077,638 | 3/1978 | Lund | 280/21 |
| 4,129,313 | 12/1978 | Benson | 280/12 H |
| 4,310,169 | 1/1982 | Brough | 280/12 K |
| 4,320,905 | 3/1982 | Andrew et al. | 280/12 H |
| 4,353,573 | 10/1982 | Morgan | 280/606 |
| 4,403,785 | 9/1983 | Hottel | 280/609 X |

FOREIGN PATENT DOCUMENTS

| | | | |
|---|---|---|---|
| 1580181 | 7/1970 | Fed. Rep. of Germany | 280/12 C |
| 2711930 | 9/1978 | Fed. Rep. of Germany | 280/21 R |

Primary Examiner—John J. Love
Assistant Examiner—Everett G. Diederiks, Jr.
Attorney, Agent, or Firm—Kenway & Jenney

[57] ABSTRACT

A recreational snow sled comprises an elongated molded plastic shell having a longitudinal central rib forming a U-shaped bottom channel of gradually increasing depth toward the rear of the sled. The sled is designed to carry a person seated in a kneeling position straddling the hump formed by the central channel. The rider is restrained at the knees by a strap running across the forward gunwales of the shell. When the sled is sliding downhill, the central channel tends to form a ridge of packed snow enhancing axial stability and maneuverability. The angle of attack may be controlled by leaning backwards so that the front of the sled is tilted up by the knee strap.

12 Claims, 8 Drawing Figures

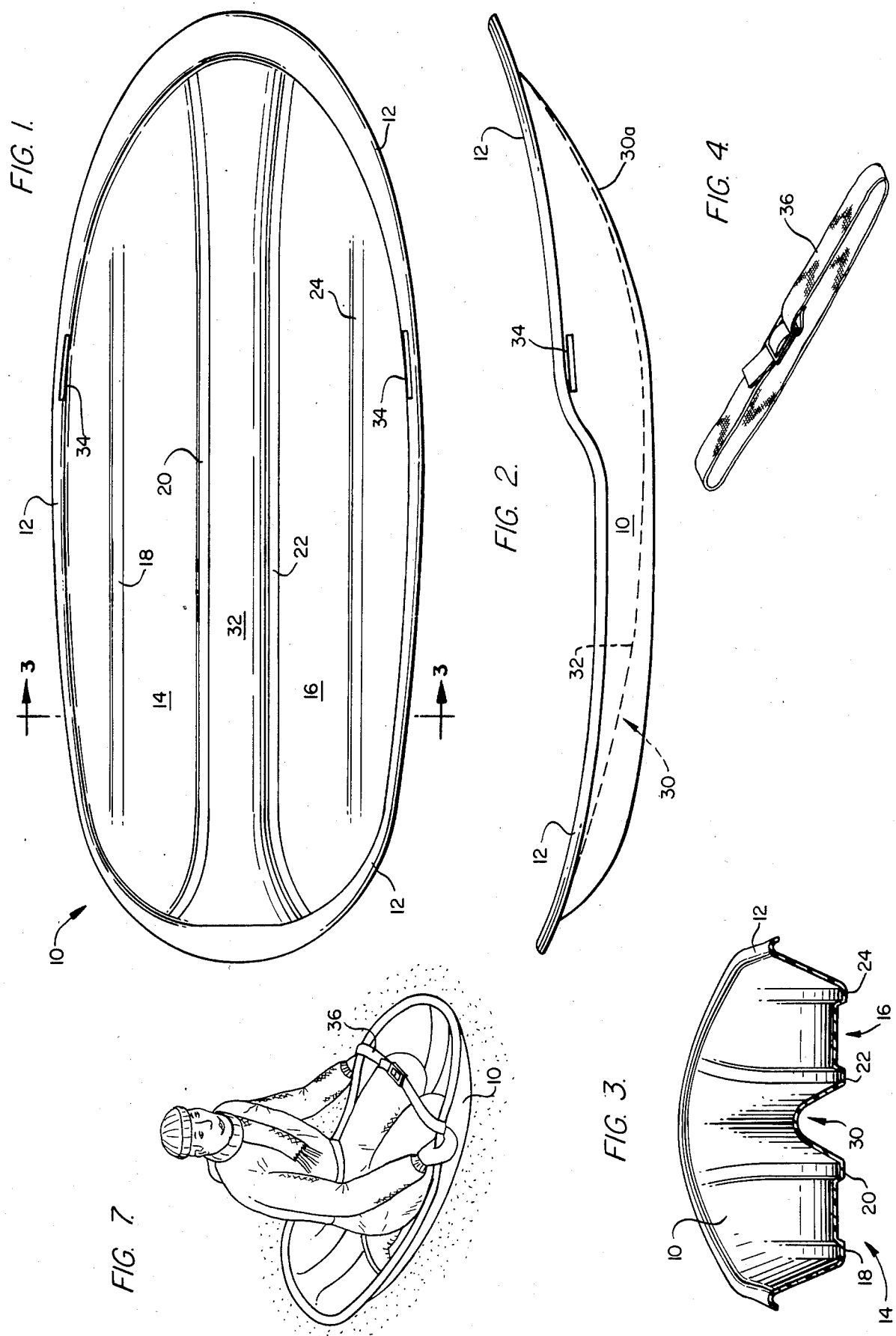

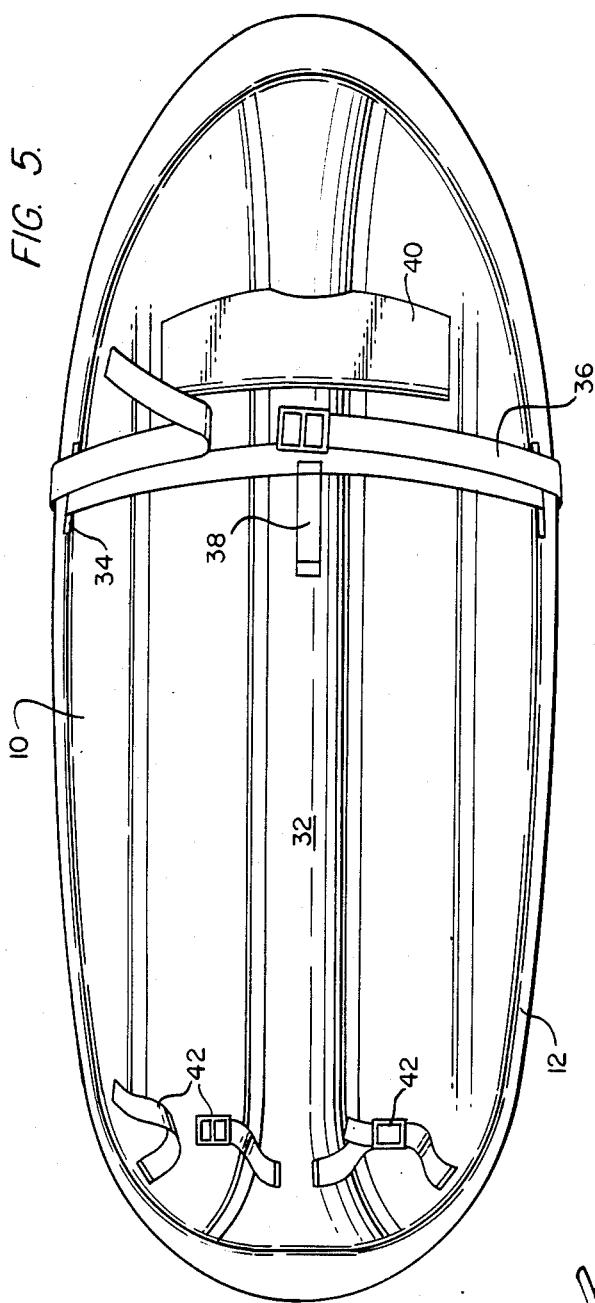
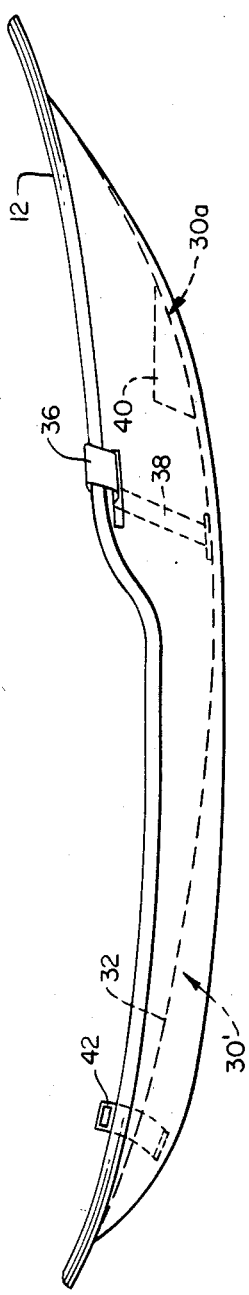
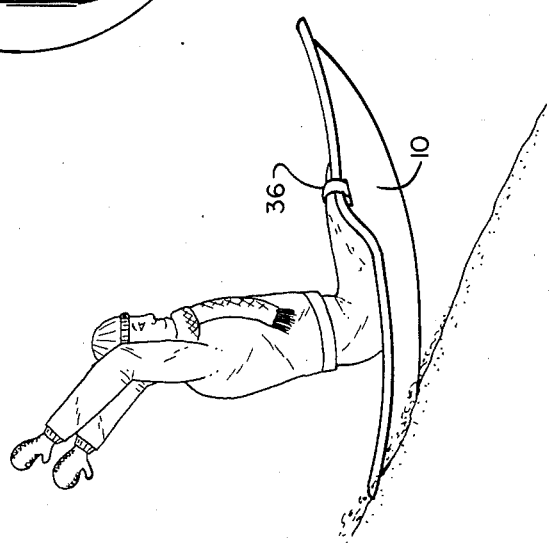

1

RECREATIONAL SLED

BACKGROUND OF THE INVENTION

The invention relates generally to recreational snow sleds of the molded plastic toboggan type.

Because of their rugged low cost lightweight construction, one-piece vacuum formed thermoplastic shell type sleds have became extremely popular in recent years. However, the rudimentary runners molded into the bottom of conventional plastic shell sleds provide no steering capability and little axial stability in deep snow, thus restricting the practical use of the sleds to packed snow conditions where the loose snow depth is minimal. So-called deep powder snow conditions found in high mountainous areas such as the Rocky Mountains in the western United States are generally unsuitable for conventional sledding.

SUMMARY OF THE INVENTION

The general object of the present invention is to enhance the control and axial stability of a one-piece plastic shell sled so that it can be used under all snow conditions including deep powder. More specifically, the objects of the invention include endowing a one-piece plastic sled with true steering capability in deep snow and providing a form of natural braking action. A corollary objective is to promote a new form of recreational sledding known as downhill powder sled racing.

These and other objects of the invention are achieved through the geometrical design of a one-piece elongated molded thermoplastic shell racing sled having a continuously curved bottom with a pronounced central longitudinal channel of increasing depth from fore to aft. The sled carries one rider seated in a kneeling position straddling the resulting longitudinal hump in the floor of the sled. The legs are restrained at the knee by means of an adjustable knee strap running transversely across the forward gunwales of the sled. The strap and central hump stabilize the position of the rider to establish the center of gravity of the sled and rider. When the sled is racing downhill, the central channel tends to construct a monorail of packed snow enhancing axial stability and enabling more precise steering. A natural braking action is effected by leaning backwards and lifting the bow of the sled by the knee strap.

BRIEF DESCRIPTION OF THE DRAWINGS

FIG. 1 is a top plan view of the plastic shell of the sled according to the invention.

FIG. 2 is a side view in elevation of the sled of FIG. 1.

FIG. 3 is a transverse sectional view taken along lines 3—3 of Fig. 1

FIG. 4 is a perspective view of the knee strap for the sled of FIG. 1

FIG. 5 is a top plan view similar to that of FIG. 1 showing another embodiment of the sled including a knee stop and foot straps.

FIG. 6 is a side view in elevation of the embodiment of FIG. 5

FIG. 7 is a pictorial perspective view of a rider seated in the sled according to the invention.

FIG. 8 is a pictorial perspective view of a rider lifting the front of the sled for braking.

DESCRIPTION OF THE PREFERRED EMBODIMENTS

The downhill racing sled according to the invention is specifically designed to take advantage of deep powder snow conditions. As shown in FIGS. 1-3, the sled is comprised of a one-piece elongated molded shell 10, preferably of vacuum-molded thermoplastic. (The bow or front is on the right as viewed in FIGS. 1 and 2.) The shell 10 presents a generally crescent-shaped profile as shown in FIG. 2. The upper outwardly rolled molded edge of the shell forms a continuous railing or gunwales 12 surrounding the sled. The gunwales 12 are raised at the bow to afford handholds and to protect against the intrusion of snow. The bottom of the sled while generally curved in profile as shown in FIG. 2, exhibis a radical hull design with a complex symmetrical geometry. In cross-section as shown in FIG. 3, a pair of generally flat parallel runners 14 and 16 are defined by molded downwardly protruding parallel ribs 18 and 20 and 22 and 24. The flat areas 26 and 28 between the pairs of ribs act like wide skis to support the sled while moving through the snow. The projecting ribs 18, 20, 22 and 24 serve to guide the sled in a straight path and enhance tracking in packed snow in the conventional manner. Between the two runners 14 and 16, a main central channel 30 extends longitudinally from the front to the rear of the sled with progressively increasing depth as shown in FIGS. 2 and 3. The inside ribs 20 and 22 define the edges of the recess 30 and are slightly outwardly flared with gradually increasing spacing at both ends of the sled. Inside the sled the molded channel 30 forms a large longitudinal central rib or keel-like hump 32 running down the center of the sled. Because of the increasing depth of the snow channel 30 toward the rear of the sled, the hump 32 becomes more pronounced toward the rear as shown in phantom in FIG. 2. In the bow, a pair of slots 34 are formed in opposite side walls just beneath the gunwales to receive the adjustable knee strap 36 (FIG. 4) which extends transversely across the gunwales.

In the embodiment of FIGS. 5 and 6, additional means are included for securing the rider in the sled. A center tie-down strap 38 secures the bottom of the knee strap 36 to the hump 32 between the rider's thighs. An optional cushioned knee stop 40 and foot straps 42 are used in combination with the knee strap 36 to maintain the axial position of the rider constant relative to the sled.

In operation, as shown in FIGS. 7 and 8, the sled 10 accommodates a single rider seated in a kneeling position straddling the center hump 32. The legs are restrained at the knee by the knee strap 40 which can be appropriately tensioned and buckled as shown. In the embodiment of FIGS. 5 and 6, the foot straps form loops which engage the bottom of each foot to stop backward sliding of the rider relative to the sled. Forward sliding is prevented by the knee stop 40. The object of the various straps and stops is to secure the rider to the sled so that the sled serves as a controllable surface action as an extension of the body rather than an independent vehicle in which the rider is merely a passenger. As the sled slides downhill in deep snow, the shallow tapering lead-in portion 30a (FIG. 2) tends to pack the snow into the channel 30 and form a continuous monorail-like rige of snow under the rider. Leaning backwards slightly tends to rotate the sled about a transverse axis pitching the bow of the sled upwards so that the deepest part of the channel 30 is brought under the center of gravity of the rider thus tending to slow the sled. At the same time, the monorail effect provides the sled with greater maneuverability. When the rider leans to one side, the snow monorail becomes banked tending to turn the sled in an arc. The channel 30 provides a kind of "edge-control" analogous to skiing.

Leaning forward reduces the effect of the channel 30. The shallower depth of the channel directly below the rider reduces the sled area in frictional contact with the snow. The result is a dramatic increase in the sled's speed when schussing downhill.

Unlike conventional sleds, which are designed with packed snow sledding hills in mind, the above-described downhill racing sled displays a new principle of sled design which takes advantage of the loose snow depth to selectively enhance control while maintaining low cost molded one-piece shell design. The large central channel exhibits a pseudo-twin-hull design approach not apparent in prior art sleds.

The channel serves three known functions. First, to a varying degree controlled by the rider, the channel serves to pack the snow under the rider in a monorail configuration improving axial stability and allowing steering of the sled in otherwise loose amorphous snow conditions in which conventional runners would be useless. Second, the straddled hump helps secure the rider. Third, the channel is a reinforcing rib which increases the longitudinal rigidity of the shell thus permitting extremely lightweight construction.

The development of the downhill racing sled described herein with its inherently superior maneuverability opens to avid sled enthusiasts sledding country formerly accessible only to skiers. Indeed, the radical hull design of the downhill sled has the potential to create a distinctly new sport.

The foregoing description of the preferred embodiments is intended to be illustrative of one specific configuration according to the general principle of the invention. For example, other devices for securing the rider on the sled may provide equivalent restraint. These and other variations, modifications or additions may be made without departing from the spirit and scope of the invention define by the appended claims and equivalents thereto.

What is claimed is:

1. A downhill snow sled, comprising
   an elongated shell having a shallow central longitudinal channel with a smooth rounded inverted trough-like contour throughout its length gradually smoothly continuously becoming more pronounced from the front to the rear, said channel having a smooth continuous surface facing the snow free of obstructions and abrupt changes in contour such that in unpacked snow conditions the entire channel fills with a conforming ridge of snow over substantially the entire length of the channel, said shell having a continuously curved bottom and the top of the trough-like channel being continuously curved in the same sense as the bottom of said shell, the curves defining the bottom and top of the channel, viewed from the side, being substantially nonparallel over the length of said channel and approximately intersecting toward the front of the sled defining a crescent-shaped profile for said channel,
   said channel being shallow and narrow enough admidships to allow a rider to straddle the hump formed by the channel in a hunkered-down position with the legs substantially completely folded beneath the rider resting on the floor of the shell on either side of said hump under the rider's body, and
   leg restraint means for engaging the tops of the lower thighs of each leg of the rider in said hunkered-down position and urging the legs against the floor to secure the rider's folded legs to the floor of the shell on either side of the hump so as to bind the rider's legs to the sled in a fixed position,
   whereby said channel cuts a ridge-like track of snow providing axial stability for traversing a hill and the rider by shifting his weight can change the direction of travel and reestablish a new track to traverse back and forth down a hill.

2. The sled of claim 1, wherein said shell includes substantially parallel rib-like downward projections defining the edges of said channel.

3. The sled of claim 2, wherein the spacing between said rib-like projections is gradually increased toward the forward end of the shell where the channel depth is minimum to form a tapered lead-in zone.

4. The sled of claim 2, further comprising an outer pair of rib-like projections generally parallel to said first pair for defining a pair of generally transversely flat ski-like runners on either side of said channel in the bottom of said shell.

5. The sled of claim 1, wherein the edges of the shell on either side are raised toward the front of the sled to form handholds.

6. The sled of claim 1, wherein toward the front of the sled the reducing depth of said channel approaches zero.

7. The sled of claim 1, wherein said leg restraint means includes strap means secured to sides of said shell and extending transversely across the forward interior thereof for restraining the rider's legs.

8. The sled of claim 7, wherein said strap means is further secured to said hump.

9. The sled of claim 1, wherein said leg restraint means includes knee stop secured to the forward floor of the shell forming a knee engaging abutment.

10. The sled of claim 1, wherein said leg restraint means includes means secured to the rear floor of said shell forming a rearward abutment for restraining the rider's feet.

11. The sled of claim 1, wherein said leg restraint means includes means for securing the rider's feet to the floor of the shell.

12. The sled of claim 11, wherein said feet securing means includes foot straps.

* * * * *